United States Patent [19]

Torres et al.

[11] Patent Number: 5,749,551
[45] Date of Patent: May 12, 1998

[54] PORTABLE DEVICE TO ALLOW FOR SIMULTANEOUS DUPLEX PRINTING AND SCANNING ON SINGLE PASS MACHINES

[76] Inventors: Eric R. Torres, 21 W. 581 North Ave., Lombard, Ill. 60148; Jesus Almanza, 504 Valerie La., Apt. 4, Addison, Ill. 60101

[21] Appl. No.: 707,112

[22] Filed: Sep. 3, 1996

(Under 37 CFR 1.47)

[51] Int. Cl.[6] .................................................. A47B 96/06
[52] U.S. Cl. .................................................. 248/205.1
[58] Field of Search .................... 248/200, 205.1, 248/214, 220.21; 347/12, 40, 41, 42, 43, 86, 117; 101/93.11, 93.12; 235/479

[56] References Cited

U.S. PATENT DOCUMENTS

| | | | |
|---|---|---|---|
| 4,739,415 | 4/1988 | Toyono et al. | 347/12 X |
| 4,935,916 | 6/1990 | Suzuki et al. | 235/479 X |
| 5,232,185 | 8/1993 | Schorr et al. | 248/27.3 |
| 5,326,066 | 7/1994 | Tischer | 248/451 |
| 5,456,539 | 10/1995 | Wright et al. | 400/82 |

*Primary Examiner*—Ramon O. Ramirez
*Attorney, Agent, or Firm*—Cherskov & Flaynik

[57] ABSTRACT

A bracket for enabling existing printing or optical scanning machines to perform in a single pass duplex printing or optical scanning is provided comprising a support structure for a standard print-head cartridge or optical scanner which situates the cartridge beyond the periphery of the standard machine and which is reproducibly adjustable to accommodate different machine dimensions, different print-head cartridge sizes and brands, and different dimensions of printable substrate or documents.

20 Claims, 6 Drawing Sheets

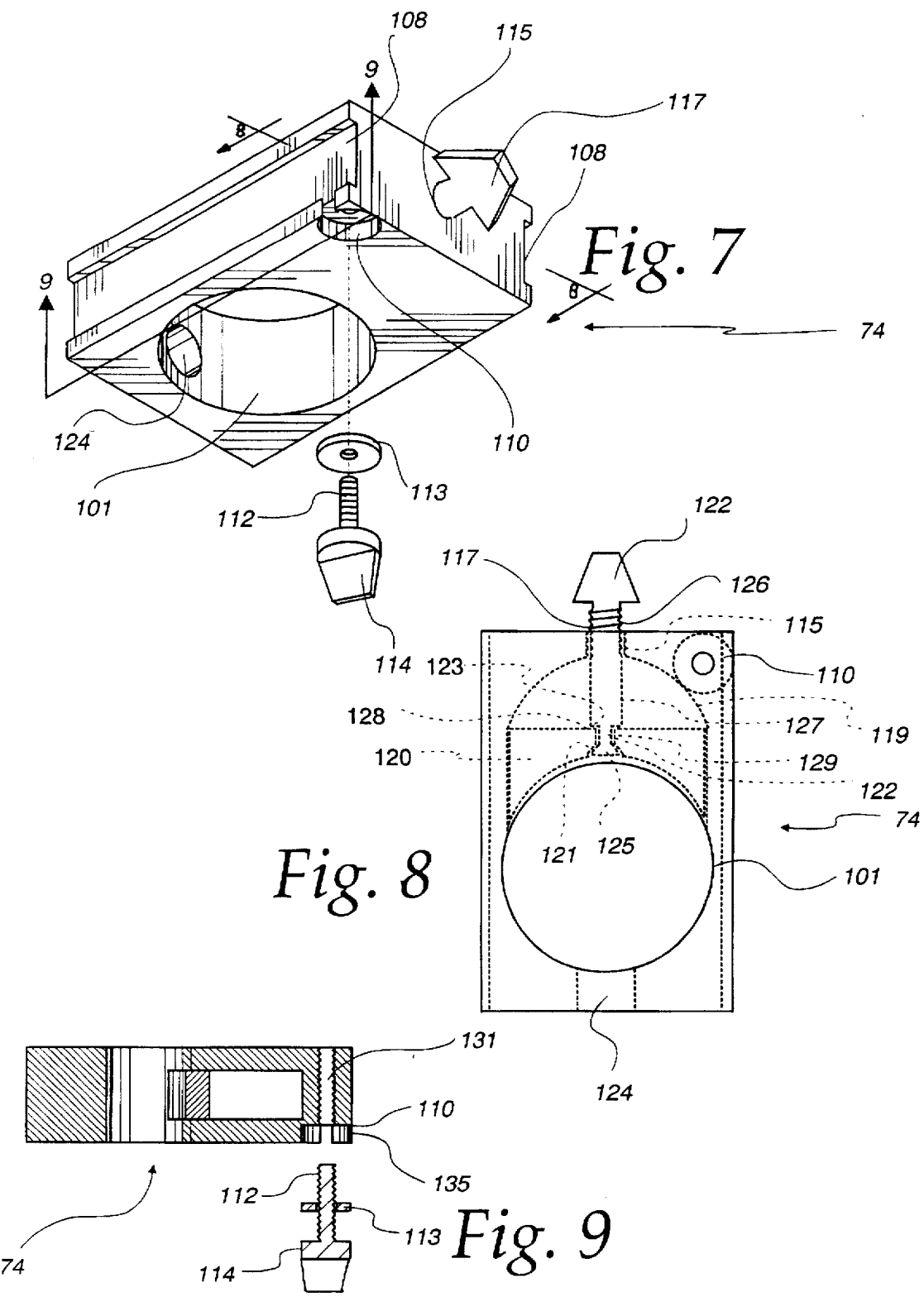

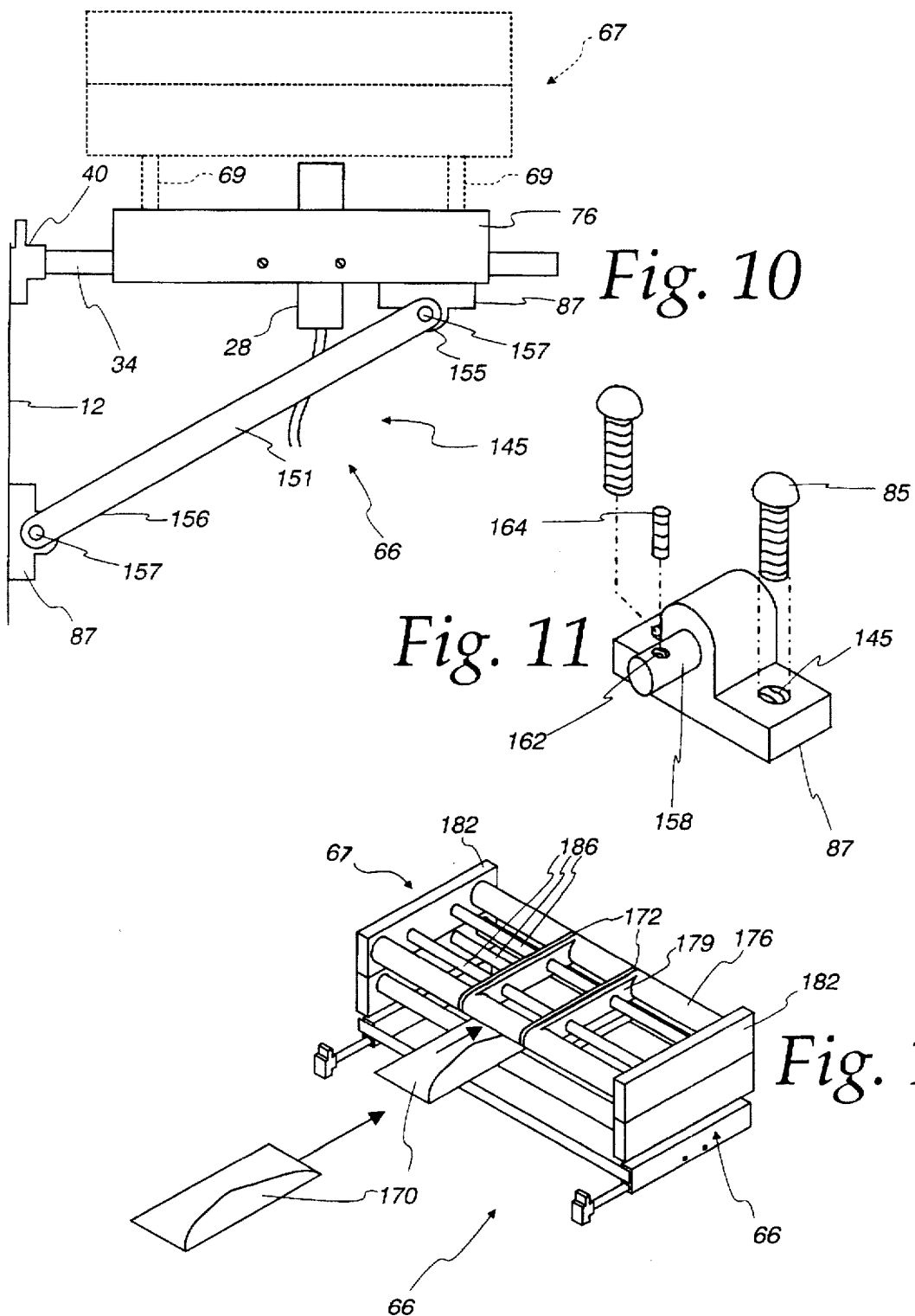

PORTABLE DEVICE TO ALLOW FOR SIMULTANEOUS DUPLEX PRINTING AND SCANNING ON SINGLE PASS MACHINES

BACKGROUND OF THE INVENTION

1. Field of the Invention

This invention relates to printers and optical scanners and more specifically, this invention relates to a method and device for enabling commercially available ink-jet printers and optical scanners to print or scan both sides of a substrate in a single pass.

2. Background of the Invention

Ink-jet printers typically incorporate print cartridges removably received by a carriage. The carriage traverses back and forth across a sheet of medium in a first predetermined direction while a substrate, such as paper, is advanced in a second predetermined direction (usually perpendicular to the first predetermined direction).

One example of a configuration incorporating moving print heads is U.S. Pat. No. 5,456,539, issued on Oct. 10, 1995, wherein two opposing print-heads are mounted on moving carriages driven reciprocally in tandem by one drive belt. This configuration enables simultaneous printing on both sides of a substrate that has been placed between thee cartridges.

However, when high-volume, high-speed printing is required, movable print heads fail to render high quality images. In such instances, a plurality of print-heads are mounted vertically in a fixed position and the medium is transported by a system of drive belts over a horizontal plane or drive base so that the print-heads spray ink downwardly onto the medium as the medium passes under the print heads. Vacuum suction is applied between the medium and the drive base so as to ensure that the distance between print-heads and medium remains constant. Such commercially available systems are the Videojet System 4000 and the Jet Stream 2, both manufactured by Videojet, Inc., Wood Dale, Ill.

Typically, when printing is required on both sides of the medium (e.g., an envelope), printing is done on a first side of the medium and then the medium is flipped to have the process repeated on a second side of the medium. This method has obvious disadvantages, especially when there has to be a one-to-one correspondence between what is printed on one side and what is printed on the other.

Presently, to accomplish printing on both sides (i.e., duplex printing) of the medium in a single pass in the fixed print-head mode, the vacuum plane of drive bases are reconfigured to accommodate upward spraying heads.

Also, existing optical scanning machines present similar problems in that they can scan only one side of a substrate. If information must be present on both sides of a substrate, the substrate must be flipped and passed through the scanning machine a second time.

A need exists in the art for an inexpensive device for enabling existing ink jet printing or optical scanning machines to perform duplex printing or optical scanning in a single pass. The device should not require configuration changes to the existing machinery.

Also, the device should easily be adaptable to a variety of different machines and to different sized printable substrates.

SUMMARY OF THE INVENTION

It is an object of the present invention to provide a method and device for duplex printing and/or optical scanning in a fixed-printhead or fixed-scanner mode that overcomes many of the disadvantages of the prior art.

Another object of the present invention is to provide a device for enabling existing ink-jet printing and optical scanning machines to perform duplex printing or scanning. A feature of the invented device is that it can readily receive any widely available print head or scanner head. An advantage of the invented device is the low cost associated with its use.

Yet another object of the present invention is to provide a light weight device for enabling existing ink-jet printing and optical scanning machines to perform duplex printing or duplex optical scanning. A feature of the invention is that the invented device is adjustable. An advantage of the invented device is that it can accommodate a variety of ink jet printing and optical scanning machines and a variety of substrate sizes.

Still another object of the present invention is to provide a device for duplex printing or scanning on existing ink-jet printers or scanners that will allow for quick access to print-heads or scanner heads. A feature of the invention is that the print-heads or scanner heads are slidably mounted on individual print-head- or scanner-holders that in turn are slidably mounted on elongated supporting structures. An advantage of the present invention is that the device allows for convenient mounting, servicing or replacement of the print-heads or scanner heads. A further advantage is that different holders can be incorporated in the device to simultaneous accommodate different print-heads, scanner heads, or both.

Another object of the present invention is to provide a device for enabling existing ink-jet printers to print on the entire surface of both sides of a substrate. A feature of the invention is that it mounts a print-head beyond the area covered by a standard machine's vacuum table surface. An advantage of the invention is that none of the surface of the medium or document is masked by the vacuum table's drive belts.

Yet another object of the present invention is to provide a method for enabling existing ink-jet printers to perform duplex printing that does not require openings in the driver base of the printer. A feature of the invention is the mounting of a print-head holder beyond the periphery of the driver base. An advantage of the invention is that it provides for unimpeded vacuum suction over the full surface of the driver base to assure stability of the printable substrate.

Still another object of the present invention is to provide a portable device for enabling existing ink-jet printers to perform duplex printing or optical scanning and which will allow for a fully reproducible placement of the print-heads. A feature of the invention is its incorporation of graduated markings on positioning members and precision machined fittings on coupling members. An advantage of the invention is that the markings and machined fittings allows operators to exactly reproduce the placement of print-heads with great accuracy.

Briefly, a bracket for juxtaposing a plurality of print-heads to a single-pass print table is provided, said bracket comprising a plurality of first elongated members each having a first end and a second end; a first coupling means adapted to receive said first ends; a second coupling means adapted to receive said second ends; a second elongated member having a first end adapted to be received by said first coupling means, and having a second end adapted to be received by a first attachment means, wherein the longitudinal axis of the second elongated member extends along a line which differs from the line along which the longitudinal axis of the first elongated member extends; a third elongated member having a first end adapted to be received by said second coupling means and having a second end adapted to be received by a second attachment means wherein the longitudinal axis of the third elongated member extends along a line which differs from the line along which the longitudinal axis of the first elongated member extends; and a means for holding a plurality of print-heads, said holding means slidably received by said first elongated member, wherein said holding means slides along said first elongated members and between said first and second coupling means, whereby the first and second attachment means removably position the bracket to the print table with said print-heads spraying ink upwardly.

The above bracket can also be used for juxtaposing an optical scanner to a single pass optical scanning machine thus enabling the machine to scan both sides of a substrate. For the sake of brevity, the following description refers to printing applications only.

BRIEF DESCRIPTION OF THE DRAWING

These and other objects and advantages of the present invention will become readily apparent upon consideration of the following detailed description and attached drawings, wherein:

FIG. 7 is a bottom view of an exemplary print-head cartridge base utilize in an alternative embodiment of the present invention;

FIG. 8 is a cross-sectional view of the exemplary print-head cartridge, taken along lines 8—8 of FIG. 7;

FIG. 9 is a side view of the exemplary print-head cartridge base, taken along lines 9—9 of FIG. 7;

FIG. 10 is an elevational view of supporting means utilized in conjunction with an alternative embodiment of the present invention;

FIG. 11 is a detailed view of a pivot joint incorporated in the supporting means utilized in conjunction with an alternative embodiment of the present invention; and FIG. 12 is a perspective environmental view of a prior art substrate rolling mechanism utilized in conjunction with the alternative embodiment of the present invention.

DETAILED DESCRIPTION OF THE INVENTION

The present invention enables existing high throughput ink-jet machines to provide duplex printing in a single pass without reconfiguration of existing machines. Duplex printing is especially advantageous when a need arises for specific information as addresses, serial codes, bar codes, etc., to be printed on an opposing side of a specific sheet of medium. The present invention also enables optical scanning machines to provide duplex scanning in a single pass. Such duplex scanning is advantageous when images on the two sides of a scanned document are correlated. Furthermore, the present invention enables both printing and scanning operations to be performed on opposing surfaces of a substrate.

The present invention provides a novel device and method for enhancing the functionality of existing high-volume printing processes. The device is a print-head or scanner-head bracket for positioning print-heads or scanner-heads beyond the periphery of the existing machines and at the point where a printable medium is typically ejected from the machine. The method comprises juxtaposing one or a plurality of print-heads or scanner-heads at the periphery of an existing machine at an effective position where the printable substrate is to be ejected from the machine so as to enable reproducible, duplex operations in a single pass.

Figure 1:
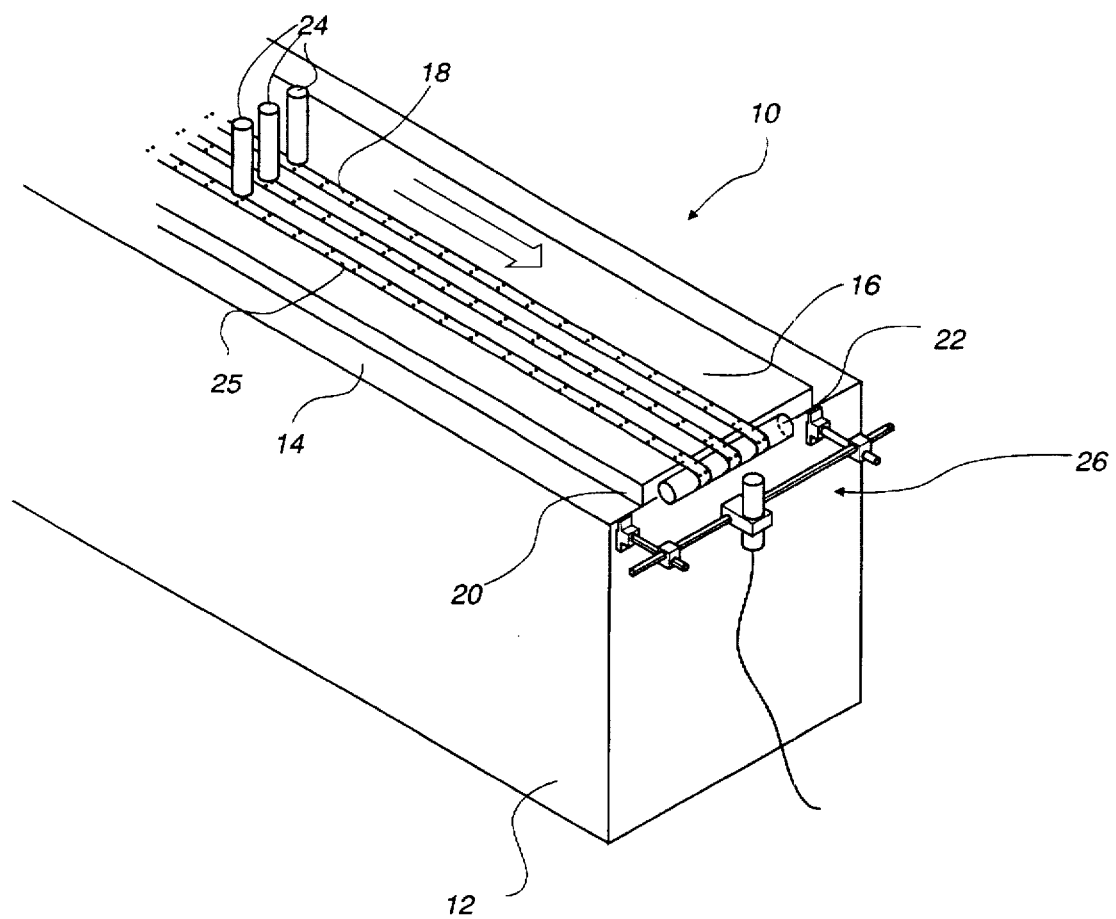
FIG. 1 a perspective environmental view of an exemplary print-head jacket mounted onto a commercially-available print table, in accordance with the present invention.

Generally, print-heads in existing machines remain fixed while the printable substrate or medium is transported at high speeds past the print-heads by drive belts. As seen in FIG. 1, a typical ink-jet printing machine, designated as numeral 10, consists of a supporting structure 12 such as a cabinet, the top of which defines a plane 14. A drive base 16, positioned on top of the plane 14, comprises a plurality of high-speed drive belts 18 that facilitate movement of printable substrates medially and along the longitudinal axis of the plane 14. The drive belts 18 travel an endless loop across the drive base in a direction designated in FIG. 1 by the arrow. At one end 20 of the drive base 16, a roller 22 enables the drive belts to travel a return path which is opposite the direction designated by the arrow.

In operation, the drive belts 18 of the printing machine 10 cause a printable substrate (not shown), having a first surface and a second surface, to be transported medially along the longitudinal axis of the plane 14. During transport, the first surface of the printable substrate is held in place by a means for adhering the substrate to the drive belts 18. Such an adhering means may include a vacuum whereby regions of the belts 18 defining apertures 25 apply negative pressure or suction to the first surface of the printable substrate. The second surface is imprinted with ink emanating from ink-jets 24.

Figure 2:
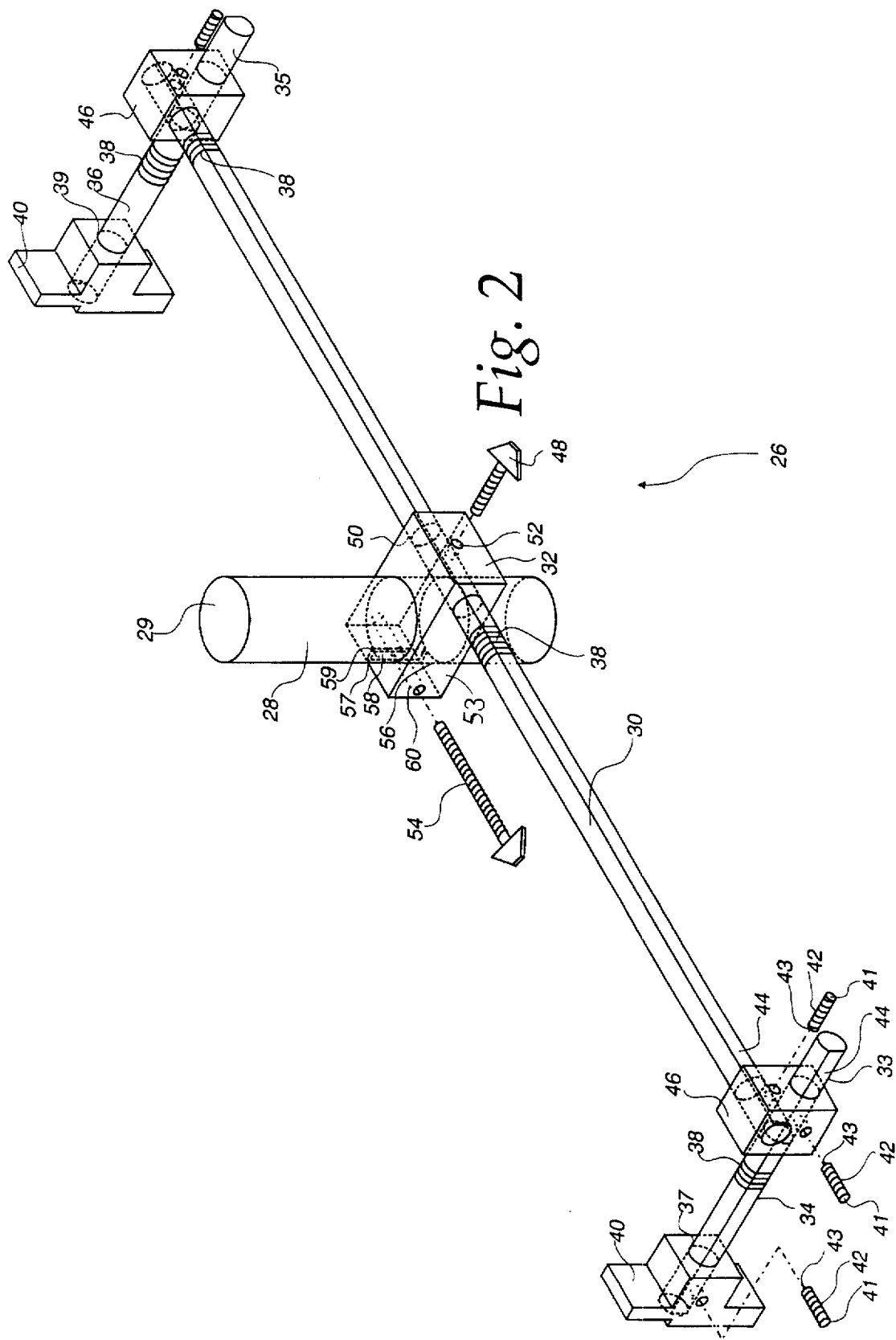
FIG. 2 is a detailed perspective view of the bracket, in accordance with the features of the present invention.

The instant invention is generally a bracket designated in FIG. 1 as numeral 26, and more explicitly illustrated in FIG. 2. As depicted in FIG. 2, the bracket 26 serves to reproducibly position an ink-jet cartridge 28 to an existing ink-jet printer. The bracket 26 consists of a first elongated member 30 which provides support for a means 32 for holding the ink-jet cartridge 28. The elongated member 30 is supported by a first end 33 of a second elongated member 34 and a first end 35 of a third elongated member 36. In many instances, for proper alignment of the print-head cartridge to the printable substrate, the longitudinal axis of the second elongated member 34 and the longitudinal axis of the third elongated member 36 bracket generally extend in the same direction and at right angles to the line formed by the longitudinal axis of the first elongated member. However, the right angle configuration, depicted in FIG. 2, is not crucial for proper print-head 28 alignment to standard ink-jet printing machines 10. Rather, proper alignment is often determined through experimentation and then reproduced using the positioning indicators 38 which are engraved or otherwise applied to the first elongated member 30, the second elongated member 34 and the third elongated member 36.

The bracket 26 is removably attached to the ink-jet printing machine 10 by a plurality of means 40 for attaching the bracket 26. While, as noted supra, the second and third elongated members 34, 36 support the first elongated member 30, the second ends 37, 39 of the second and third elongated members 34, 36 respectively, are supported by the attaching means 40. A myriad of different attachment mechanisms between the elongated members and the attaching means is suitable, including, but not limited to, adhesive, male-female threaded configurations, or snap-fit assemblies. The bracket 26 illustrated in FIG. 2 depicts second and third elongated members 34 and 36 slidably received by the attaching means 40 to be rotatably and slidably restrained by the attaching means via set screws 42. A first end 41 of the set screws 42 can be configured so as to be manipulated by any standard tool, such as a screw driver, allen wrench, or pliers. The first end 41 can also define a fluted surface to facilitate finger grasping or grasping with pliers.

The second end 43 of the set screw 42 is configured to provide maximum surface area contact with the elongated members. As such, the second end 43 of the set screw is usually machined flat when the elongated members are also machined with a flat surface 44.

The attaching means 40 is connected to the ink-jet print machine 10 via any standard mechanism, including but not limited to machine screws, adhesive, magnets (in the case where the attaching means and the adjacent print-machine surfaces comprise ferrous material), and bolts.

Figure 3:
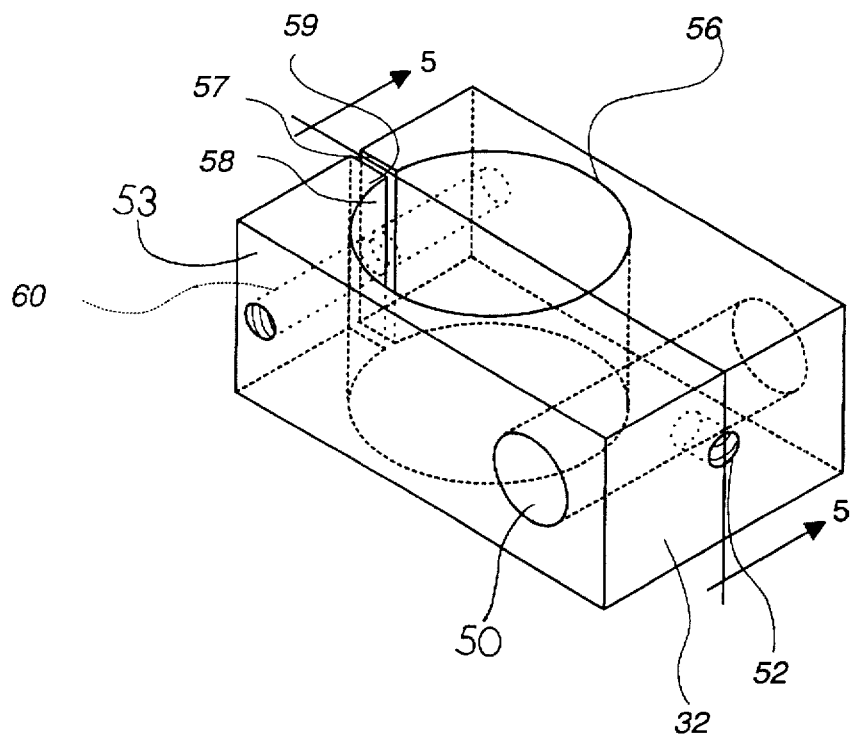
FIG. 3 is a detailed depiction of a print-head holder utilized in conjunction with the exemplary print head bracket, in accordance with the features of the present invention.

A plurality of means 46 for coupling the first elongated member 30 to the second and third elongated members 34, 36, respectively, is illustrated. The coupling means 46 are molded, machined or bored to slidably receive the first ends 33, 35, of the second and third elongated members 34, 36, respectively, and the first and second ends of the first elongated member 30. As with the attachment means 40 configuration, the elongated members are held in place within the coupling means by tightening means such as set screws 42. This set screw configuration allows infinite distal or proximal positioning of the first elongated member 30 and printhead support structure, relative to the ink-jet print machine 10, and infinite medial or lateral movement of the first elongated member relative to the second and third elongated members. The set screw configuration incorporated in the print-head holder 32 also allows infinite medial or lateral movement of the print-head holder relative to the first elongated member Print-head Positioning Detail As shown in FIG. 3, a region of the print-head holder 32 defines a rod-receiving tunnel 50 to slidably receive the first elongated member 30 so as to allow for infinite lateral or medial positioning relative to the ink-jet printing machine. This positioning is maintained via a large set screw 48 which is adapted to be received by a region of the print-head holder 32 defining a threaded aperture 52 extending at a right angle relative to the tunnel 50, and terminating at the tunnel 50. The print-head holder 32 also slidably receives the print-head 28 via a region of the print-head holder 32 defining a transverse cartridge passage way 56 that extends through the holding means 32. The periphery of the passage way 56, is interrupted by a transverse slot 58, having sides 57 and 59, whereby the slot 58 extends the length of the passage way 56, parallel with it and which also extends transversely in relation to the print-head holder 32. This configuration allows for varying the width of the slot 58 and therefore the circumference of the cartridge passage way 56.

As depicted in FIG. 2, the print-head 28 is held secure in the cartridge passage way 56 via a slot constraining screw 54, which is received by regions of the faces 57, 59 of the slot 58 defining an aperture 60. The aperture 60 comprises a bored section between faces 53 and 57 followed by a threaded section between faces 59 and 61. The aperture 60 extends along a line perpendicular to the longitudinal axis of the print-head cartridge 28 and through the sides of the print-head holder 32 that are parallel with the faces 57, 59 of the slot. When the slot constraining screw 54 spans the slot and is rotated clockwise, the width of the slot narrows thereby causing the circumference of the cartridge passage way 56 to narrow. This action holds the print-head cartridge 28 firmly in place.

Figure 4:
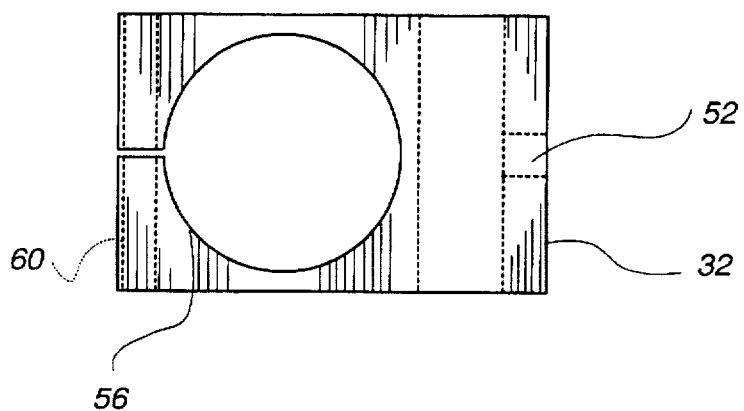
FIG. 4 is a plan view of the print-head holder utilized in conjunction with the first embodiment of the present invention.
Figure 5:
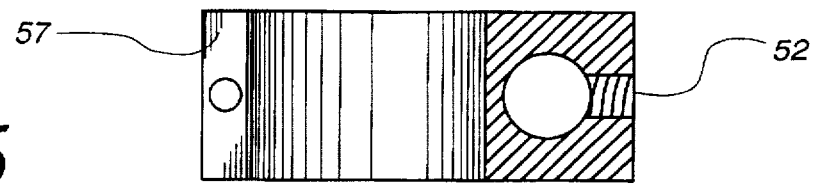
FIG. 5 is a side view of the print-head holder, taken along lines 5—5 of FIG. 3; 5

FIG. 4 is a plan detailed view of the print-head holder 32 and FIG. 5 is a side view of the print-head holder 32 taken along the lines 5—5 in FIG. 3.

Positioning of the print-head cartridge is crucial, and depends on the speed at which the existing machine is running, the size of the printable substrate, and the nature of the duplex printing job.

Once the bracket 26 is mounted to an ink-jet printing machine, the print-head cartridge holder 32 can be reproducibly positioned in virtually any point on a plane defined by the position of the large set screw 48 and the positions of the two bracket attachment means 40.

Furthermore the print-head cartridge 28 can be positioned above the plane due to it being slidably received by the cartridge passage way 56. All positions, once determined can be easily reproduced via the positioning indicators 38 on the elongated members. These positioning indicators 38 can be markings every 0.5 millimeters or some other suitable distance. Positioning indicators (not shown) also can be placed on print cartridges to determine the height of the nozzle 29 of the print cartridge 28 above the plane of the bracket 26.

Typical, existing machines have media transport rates of between approximately 50 feet per minute and 600 feet per minute. A conventional computer program controls the ink-deposition activity of the print-head.

ALTERNATIVE EMBODIMENT

Figure 6:
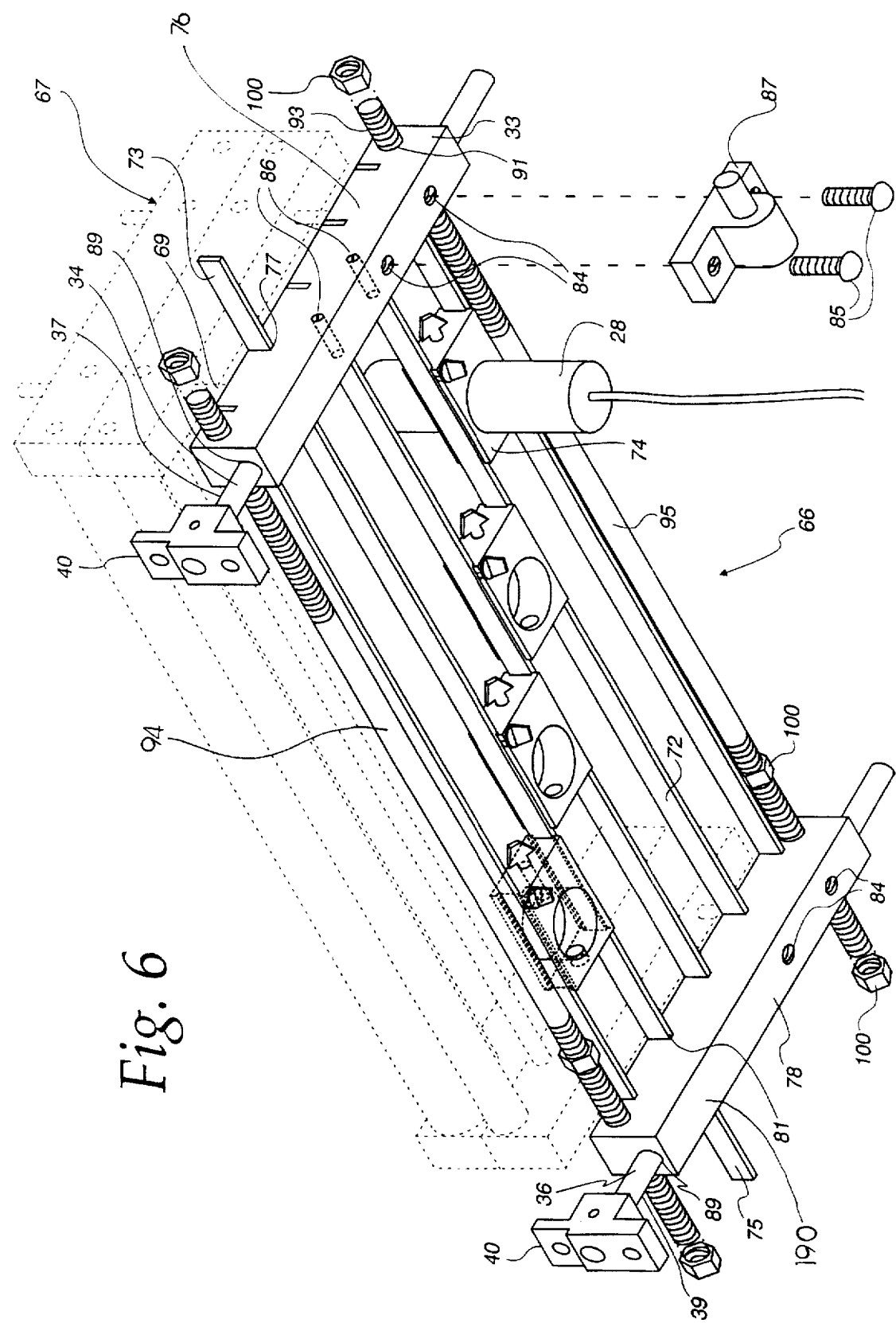
FIG. 6 is a detailed view of an alternative embodiment of the present invention.

FIG. 6 illustrates an alternative embodiment of the present invention. This alternative embodiment is intended for use on printing machines where the substrate is transported at a relatively low speed or where an extensive amount of text is to be printed on both surfaces of the substrate. Generally, this alternative embodiment is a multi-track print-head holder 66 serving to reproducibly position a plurality of inkjet cartridges 28 to an existing ink-jet printer. The print-head holder 66 is attached to a prior-art roller mechanism 67 serving to transport the substrate 170 (FIG. 12) past the inkjet cartridges 28 to be imprinted. A myriad of means for removably attaching the print-head holder below the plane of the roller mechanism 67 can be employed, including threaded rods 69, snap-fit assemblies, or clamps.

As depicted in FIG. 6, the multi-track holder comprises a plurality of elongated members 72, hereinafter designated as "rails," which are arranged parallel to each other, and which provide support for a plurality of means 74, hereinafter designated as "cartridge bases," for holding the inkjet cartridges 28. Gradations on the rails 72 (not shown) allow for the reproducible positioning of the cartridge bases 74 with respect to the rails 72.

Rail Positioner Detail

As noted supra, the rails 72 are spaced from each other in a parallel configuration. This rail positioning is facilitated via a first and a second rail positioner 76, 78 respectively, generally consisting of elongated substrates which are interchangeable in structure.

Each rail 72 comprises a first end 73 and a second end 75. The first end 73 is removably attached to the first rail positioner 76, which has means 77 to slidably receive the first end 73, and means to allow for the rigid and reproducible positioning of rails 72 with respect to first rail positioner 76. Likewise, the second end 75 of rails 72 is removably attached to the second rail positioner 78 having means 81 to slidably receive the second end 75 of rails 72 as well as means to allow for the rigid and reproducible positioning of rails 72 with respect to the second rail positioner 78. As depicted in FIG. 6 the means 77 and 81 for receiving the rails are transverse slots formed along one longitudinal edge of the rail positioners, at predetermined positions. These positions are determined by the width of the cartridge bases 74. A myriad of means for rigidly and reproducibly positioning the rails 72 viz. the rail positioners 76, 78, are suitable, including friction fitting, adhesive and clamping.

As depicted, the longitudinal axis of the rails 72 extends perpendicularly to the longitudinal axis of the rail positioners with long rails extending beyond the rail positioners in instances where the entire rail length is not necessary to position the alternative embodiment 66 to a prior art machine.

A salient feature of the second embodiment is its expendability or collapsibility features so as to accommodate a variety of printing machine sizes. For example, the same multi-head unit 66 can vary in length, due to the rail positioners 76, 78 being slidably attached to each other via the slidably-received rails 72, but also via rail positioner adjustment members 94 and 95. The rail positioner adjustment members 94, 95, illustrated in FIG. 6 as threaded rods, are adapted to be received by female threaded regions 91 of the rail positioners 76, 78. Nuts 100 allow for the rigid and reproducible attachment of the adjustment members 94, 95 to the rail positioners 76, 78. Rails can be made thin and flexible enough so as to allow for the immediate removal or insertion by hand of the cartridge bases 74 without any disassembly of the entire alternative embodiment 66.

As noted supra, the rails 72 and adjustment members 94, 95 are attached to the rail positioners 76, 78 in such a manner that one may vary the distance between the rail positioners 74, 76, and therefore the length of the multi-track print-head holder 66. Also, in as much as the rail positioners 76, 78 are slidably attached to the elongated members 34 and 36, the distance between the print-head cartridges 28 and the printing machine can vary. Thus, one may mount the invention on a wide variety of existing print machines.

Once the multi-track print-head holder 66 is sized to the existing printing machinery, a variety of attachment sites are suitable. For example, as noted supra, the rail positioners 76, 78 may define a region containing threaded apertures to receive threaded rods 69 to facilitate attachment of existing printing machinery 67 above the plane containing the rail positioners 76, 78.

The alternative embodiment 66 also can use the same supporting elongated members 34 and 36 and attaching means 40 as described supra for the previous embodiment, as shown in FIG. 2, to allow the multi-track print-head holder 66 to be removably positioned onto the periphery of existing printing machines. In this instance, a region of the rail positioners defining an aperture 89 is provided to slidably receive the second ends 37, 39 of the elongated members 34, 36, whereby the longitudinal axis of the elongated members 34, 36 are thus situated parallel to the longitudinal axis of the rail positioners 76, 78. Set screws 86 allow for the rigid and reproducible positioning of the rail positioners 76,78 with respect to the elongated members 34, 36.

For additional stability viz. an existing printing machine, and as depicted in FIGS. 10 and 11, the multi-track printhead holder 66 accommodates additional support substrates 151 pivotally attached to the depending surfaces of the rail positioners 76, 78. In this scenario, a region of the depending surfaces 190 of the rail positioners 76, 78 form threaded apertures 84 to receive screws 85 for the rigid attachment of pivot joints 87. One end 155 of the support substrates 151 are pivotally attached to the joints 87 while the other end 156 of the support substrate is similarly attached to the existing printing machine 12. Both ends of the support substrates have regions defining a transverse aperature 157. The pivot joint 87 is comprised of a center axil 158, which can be integrally formed with the pivot joint. Once the aperture 157 of the support substrate 151 is mated with the axil 158, a cotter pin or set screw 164 prevents the support substrate 151 from slipping off of the pivot joint 87.

As seen in FIG. 7 the cartridge base 74 contains a region defining a transverse passageway 101 to slidably receive the printhead cartridge 28 (not shown). The cartridge base 74 also provides a means to slidably receive the rails 72, comprising channels 108 parallel with the longitudinal axis of the cartridge base, and perpendicular to the center axis of the transverse passage way 74. The channel 108 is machined, molded, or otherwise formed to allow the rails 72 to nest therein, thereby facilitating sliding of the cartridge base 74 between two rails and along the longitudinal axis of the multi-track, print-head device 66.

As shown in FIGS. 7 and 9, the cartridge base 74 incorporates a means for locking 110 the base 74 to a position between two rails 72. The locking means 110 comprises a region on the cartridge base 74 defining a threaded aperture 131, a screw 112, and a washer 113, the screw threadably received by the aperture 131. When turned clockwise, the screw 112 causes the washer to advance and ultimately contact an edge of the rail 72 nesting inside the channel 108. To assure contact with the rail 72, the washer 113 is comprised of plastic or other compressible material and is received in a similarly shaped depression 135 which is formed on a manually-accessible surface of the cartridge base. The bottom surface of the depression 135 protrudes into the channel 108 to therefore cause a properly seated washer to fully contact the edge of the rail. Hand-tightening the screw causes the washer to hold fast the cartridge base 74 to the rail at that point. The screw 112 is actuated manually via a screw head 114, or via any standard handheld tool.

FIG. 8 is a cross-sectional view of the cartridge base 74 taken along lines 8—8 in FIG. 7. FIG. 8 illustrates how the cartridge base 74 incorporates a means for restraining the ink jet cartridge 28. The restraining means comprises a restraining jaw actuating member 117 generally cylindrical in shape, with a first end 122, a second end 129, and a threaded region 126. The restraining means also comprises a threaded female member 115 to receive the jaw actuating member 117.

The second end 129 of the jaw actuating member 117 is attached to a restraining jaw 120. A one surface of the jaw 120 distal to the first end 122 complements an outside surface of the printing cartridge 28 so that when the jaw surface contacts the cartridge surface, a close mating or high degree of contact between the two surfaces occurs. The complementary surface of the jaw contacts the cartridge 28 surface when the actuating member 117 is rotatably advanced medially into the cartridge base, toward the center axis of the transverse passageway 101. This advancement causes a shoulder 123 of the actuating member, located medially from the second end 129 of the actuating member 117, to abut the jaw 120 at face 128, which is proximal to the first end 122, and therefore exert pressure upon the jaw. A means to allow access 124 to the jaw 120 is utilized to form a flared out rivet 125 on the second end 129 of the actuating member 117. This rivet serves to confine the jaw 120 between the shoulder 123 and the rivet 125.

When the jaw 120 is not engaged or otherwise contacting the cartridge 28, the jaw 120 is fully retracted into a cavity 119 formed in the cartridge base 74. One means for forming the cavity 119 is via a fly-cutter.

FIG. 12 depicts the multi-track print-head holder 66 attached to an existing substrate handler 67 and below the horizontal plane formed by the existing substrate handler. The substrate handler 67 consists of a series of rollers 186 arranged in parallel. The rollers accommodate rubber bands 172 or some other contact enhancing material to draw a work piece 170 into above the multi-track printhead device 66 to be imprinted.

The embodiments 26, 66 can be constructed of a myriad of materials, including aluminum, stainless steel, iron, wood, or plastic. Generally, material that has sufficient rigidity to support standard ink-jet cartridges, such as those manufactured by Videojet Inc., is suitable.

While the invention has been described with reference to details of the illustrated embodiment, these details are not intended to limit the scope of the invention as defined in the appended claims. For example, a plurality of print-head cartridges can be accommodated with the device designated as the first embodiment, so as to offer more complete coverage of a substrate passing overhead.

The embodiment of the invention in which an exclusive property or privilege is claimed is defined as follows:

1. A device for juxtaposing a plurality of print-heads to a single-pass print table, said device comprising:
   a.) plurality of first elongated members, each first elongated member having a first end and a second end;
   b.) a first coupling means adapted to receive said first end;
   c.) a second coupling means adapted to receive said second end;
   d.) a second elongated member having a first end adapted to be received by said first coupling means, and having a second end adapted to be received by a first attachment means, wherein the longitudinal axis of the second elongated member extends along a line which differs from the line along which the longitudinal axis of the first elongated members extend;
   e.) a third elongated member having a first end adapted to be received by said second coupling means and having a second end adapted to be received by a second attachment means wherein the longitudinal axis of the third elongated member extends along a line which differs from the line along which the longitudinal axis of the first elongated members extend; and
   f.) a means for holding the plurality of print-heads, said means slidably received by said first elongated members, wherein said holding means slides along said first elongated members and between said first and second coupling means, whereby the first and second attachment means removably position the device to the print table.

2. The as recited in claim 1 wherein the print-heads are ink-jet nozzles.

3. The device as recited in claim 1 wherein the first elongated members are slidably received by the second elongated member and the third elongated member.

4. The device as recited in claim 1 wherein the print-head holding means is adapted to slidably receive the print-heads.

5. The device as recited in claim 1 wherein said first elongated members, said second elongated members and said third elongated member have means for indicating position of said coupling means and the print-head holding means.

6. The device as recited in claim 1 wherein the second elongated member and the third elongated member are of equal length.

7. The device as recited in claim 1 wherein the longitudinal axis of the second elongated member is parallel to the longitudinal axis of the third elongated member.

8. The device as recited in claim 1 wherein the longitudinal axis of the second elongated member and the longitudinal axis of the third elongated member are perpendicular to the longitudinal axis of the first elongated members.

9. A bracket for juxtaposing a plurality of optical scanners to a single-pass optical scanning device said bracket comprising:
   a.) a plurality of first elongated members having a first end and a second end;
   b.) a first coupling means adapted to receive said first end;
   c.) a second coupling means adapted to receive said second end;
   d.) a second elongated member having a first end adapted to be received by said first coupling means, and having a second end adapted to be received by a first attachment means, wherein the longitudinal axis of the second elongated member extends along a line which differs from the line along which the longitudinal axis of the first elongated members extend;
   e.) a third elongated member having a first end adapted to be received by said second coupling means and having a second end adapted to be received by a second attachment means wherein the longitudinal axis of the third elongated member extends along a line which differs from the line along which the longitudinal axis of the first elongated members extend; and
   f.) a means for holding the plurality of optical scanners said means slidably received by said first elongated member, wherein said holding means slides along said first elongated members, and between said first and second coupling means, whereby the first and second attachment means removably position the bracket to the optical scanning machine.

10. The device as recited in claim 9 wherein the first elongated members are slidably received by the second elongated member and the third elongated member.

11. The device as recited in claim 9 wherein the optical scanner holding means is adapted to slidably receive the optical scanners.

12. The device as recited in claim 9 wherein the first elongated members, the second elongated member and the third elongated member have means for indicating position of the couplers and optical scanner holding means.

13. The device as recited in claim 9 wherein the second elongated member and third elongated member are of equal length.

14. The device as recited in claim 9 wherein the longitudinal axis of the second elongated member is parallel to the longitudinal axis of the third elongated member.

15. The device as recited in claim 9 wherein the longitudinal axis of the second elongated member and the longitudinal axis of the third elongated member are perpendicular to the longitudinal axis of the first elongated members.

16. A bracket for positioning a print-head to a single-pass print table, said bracket comprising:
   a.) a first elongated member having a first end and a second end;
   b.) a first coupling means adapted to receive said first end;
   c.) a second coupling means adapted to receive said second end;
   d.) a second elongated member having a first end adapted to be received by said first coupling means, and having a second end adapted to be received by a first attachment means, wherein the longitudinal axis of the second elongated member extends along a line which differs from the line along which the longitudinal axis of the first elongated member extends;
   e.) a third elongated member having a first end adapted to be received by said second coupling means and having a second end adapted to be received by a second attachment means wherein the longitudinal axis of the third elongated member extends along a line which differs from the line along which the longitudinal axis of the first elongated member extends; and
   f.) a means for holding the print-head, said means slidably received by said first elongated member, wherein said holding means slides along said first elongated member and between said first and second coupling means, whereby the first and second attachment means removably position the bracket to the print table.

17. The bracket as recited in claim 16 wherein the print-head is an ink-jet nozzle.

18. The bracket as recited in claim 16 wherein the first elongated members are slidably received by the second elongated member and the third elongated member.

19. The device as recited in claim 16 wherein the print-head holding means is adapted to slidably receive the print head.

20. The device as recited in claim 16 wherein said first elongated member, said second elongated member and said third elongated member have means for indicating position of said coupling means and the print-head holding means.

* * * * *